UNITED STATES PATENT OFFICE.

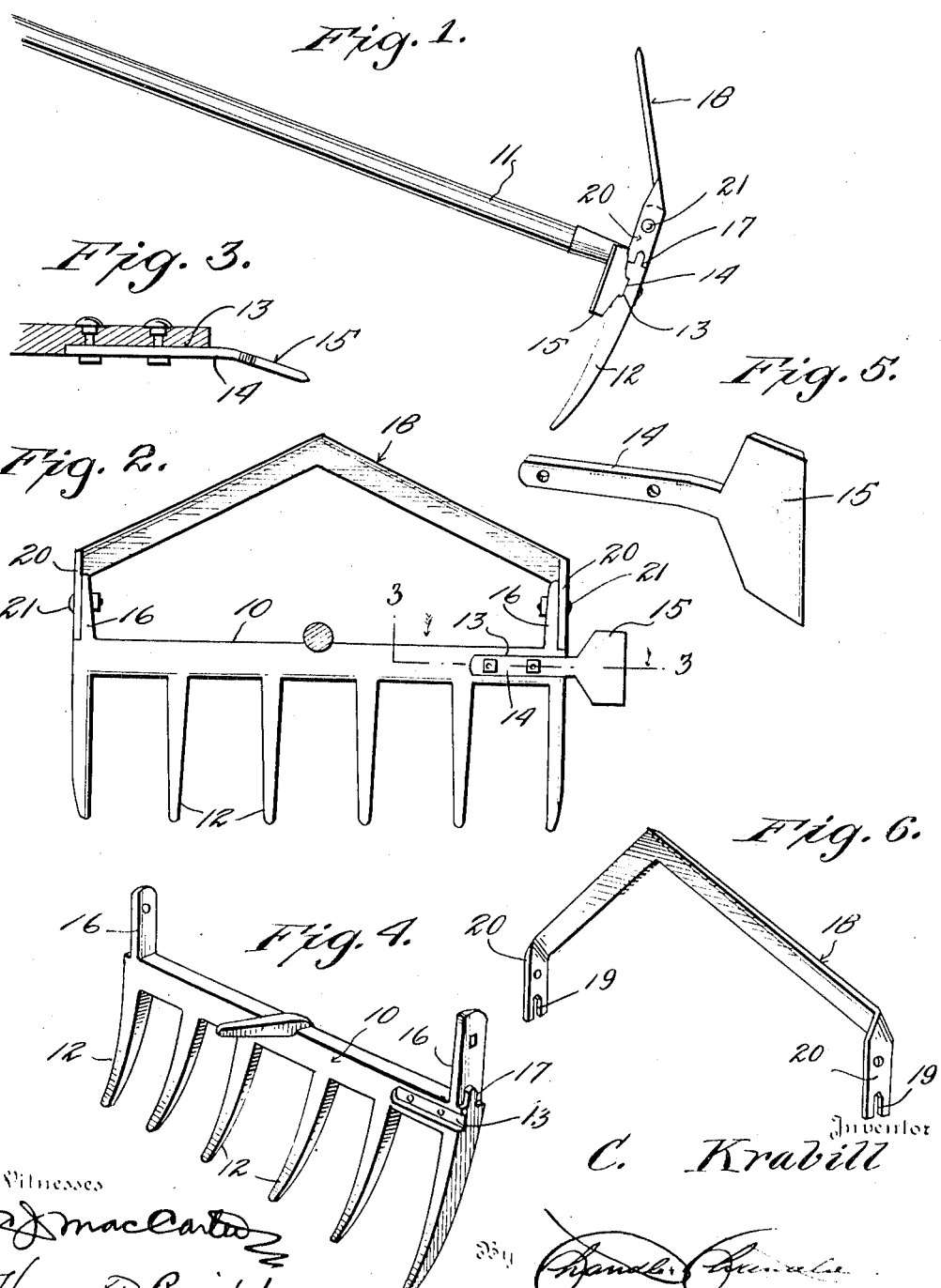

CHRISTIAN KRABILL, OF DENTON, MARYLAND, ASSIGNOR OF ONE-HALF TO JACOB HARVEY BEER, OF DENTON, MARYLAND.

GARDEN IMPLEMENT.

1,120,062.  Specification of Letters Patent.  Patented Dec. 8, 1914.

Application filed March 11, 1914. Serial No. 824,005.

*To all whom it may concern:*

Be it known that I, CHRISTIAN KRABILL, a citizen of the United States, residing at Denton, in the county of Caroline, State of Maryland, have invented certain new and useful Improvements in Garden Implements; and I do hereby declare the following to be a full, clear, and exact description of the invention, such as will enable others skilled in the art to which it appertains to make and use the same.

This invention relates to garden implements.

The object of the invention resides in the provision of a garden implement embodying rake, hoe and cutting elements detachably connected together in such manner that any of said elements can be removed and reapplied without disturbing the remaining elements.

A further object of the invention resides in the provision of a garden implement of the type referred to which will be simple in construction, efficient in use and which may be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of a garden implement constructed in accordance with the invention; Fig. 2, a front view of the implement; Fig. 3, a section on the line 3—3 of Fig. 2; Fig. 4, a perspective view of the rake element; Fig. 5, a perspective view of the cutting element, and Fig. 6, a perspective view of the hoe element.

Referring to the drawings the improved implement is shown as comprising a head 10 secured in any suitable manner to a handle 11. This head has formed integral therewith a plurality of rake teeth 12. Formed on the rear side of the head 10 and opening through one end thereof is a recess 13 in which is detachably secured the shank 14 of a hoe element 15. Projecting from each end of the head 10 opposite to the teeth 12 is an arm 16 the outer side of which is disposed slightly inward from the adjacent end of the head to form a shoulder and lug 17. The cutting element of the tool is shown as comprising a V-shaped member 18 having its terminal portions bent so as to run parallel and provided at their free ends respectively with recesses 19. The terminal portions of the member 18 are indicated at 20 respectively and are disposed against the outer sides of respective arms 16 and secured to the latter by means of detachable bolts 21, the recesses 19 receiving the shoulders 17 respectively and securing the V-shaped member against pivotal movement on the bolts 21.

By this construction it will be obvious that the cutting element of the implement and also the hoe element can be removed from the head 10 when worn out and new elements applied.

What is claimed is:—

In a garden implement of the class described the combination of a head, a handle secured to said head, teeth formed along one edge of the head, arms on the opposite edge of the head disposed respectively inwardly of the adjacent end of the head to form shoulders having lugs thereon, a cutting element having its terminals disposed against the outer sides of said arms and provided with recesses receiving said lugs respectively, and means for detachably securing the terminals of the cutting element to said arms.

In testimony whereof, I affix my signature, in the presence of two witnesses.

CHRISTIAN KRABILL.

Witnesses:
 L. RALPH THAWLEY,
 H. E. RAMSDELL.